Figure 1:
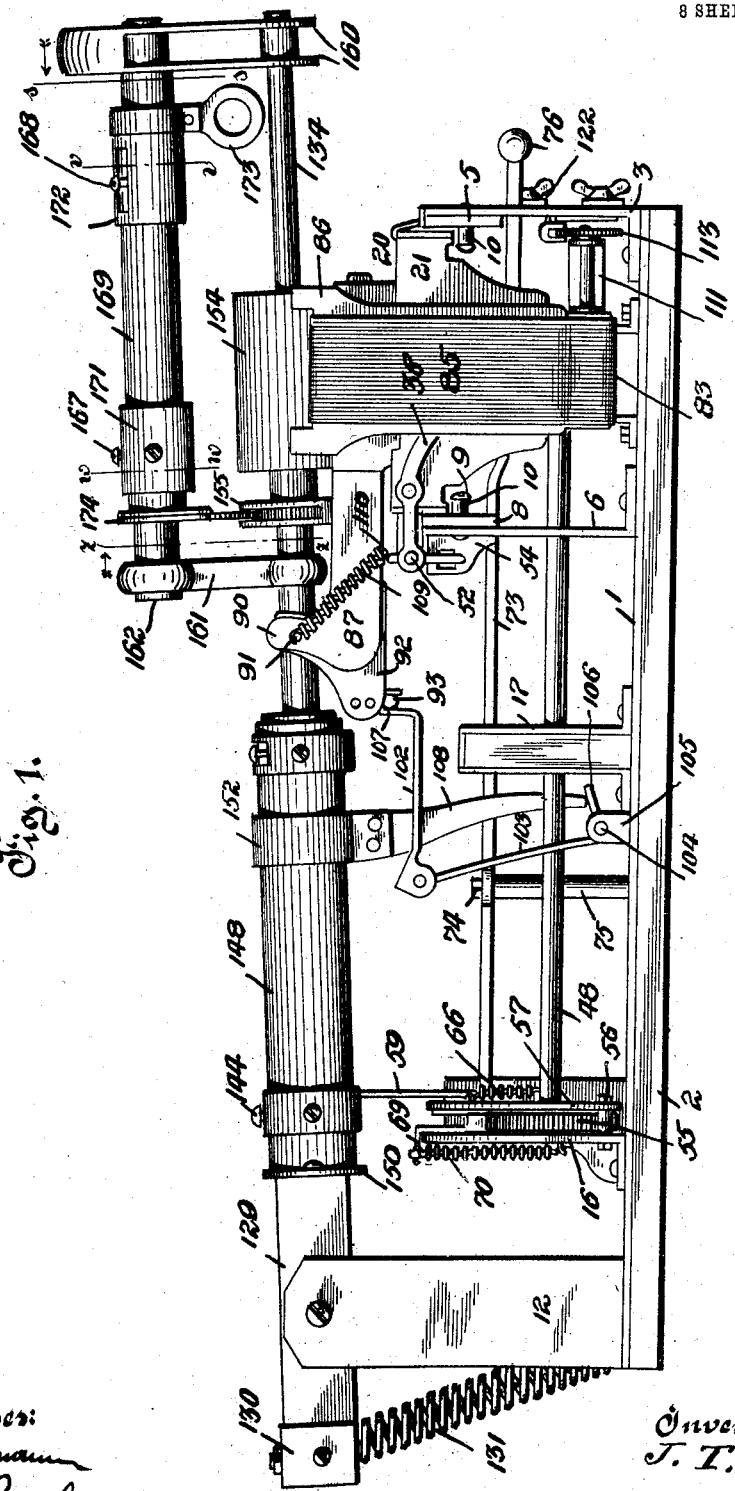

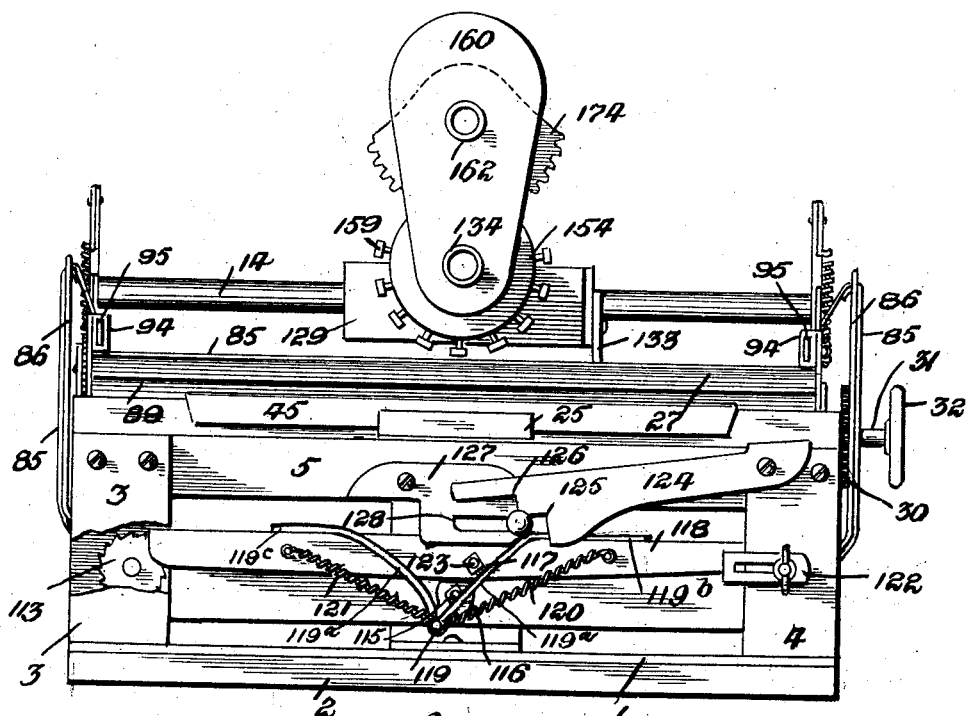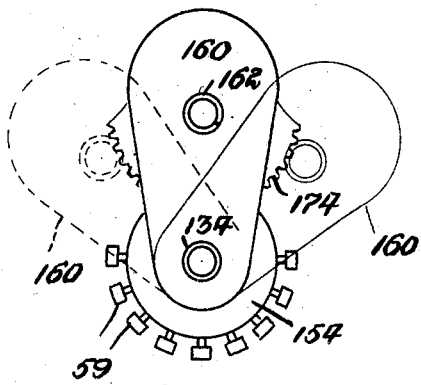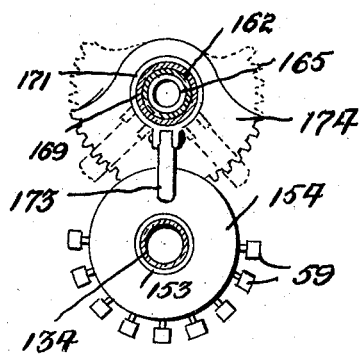

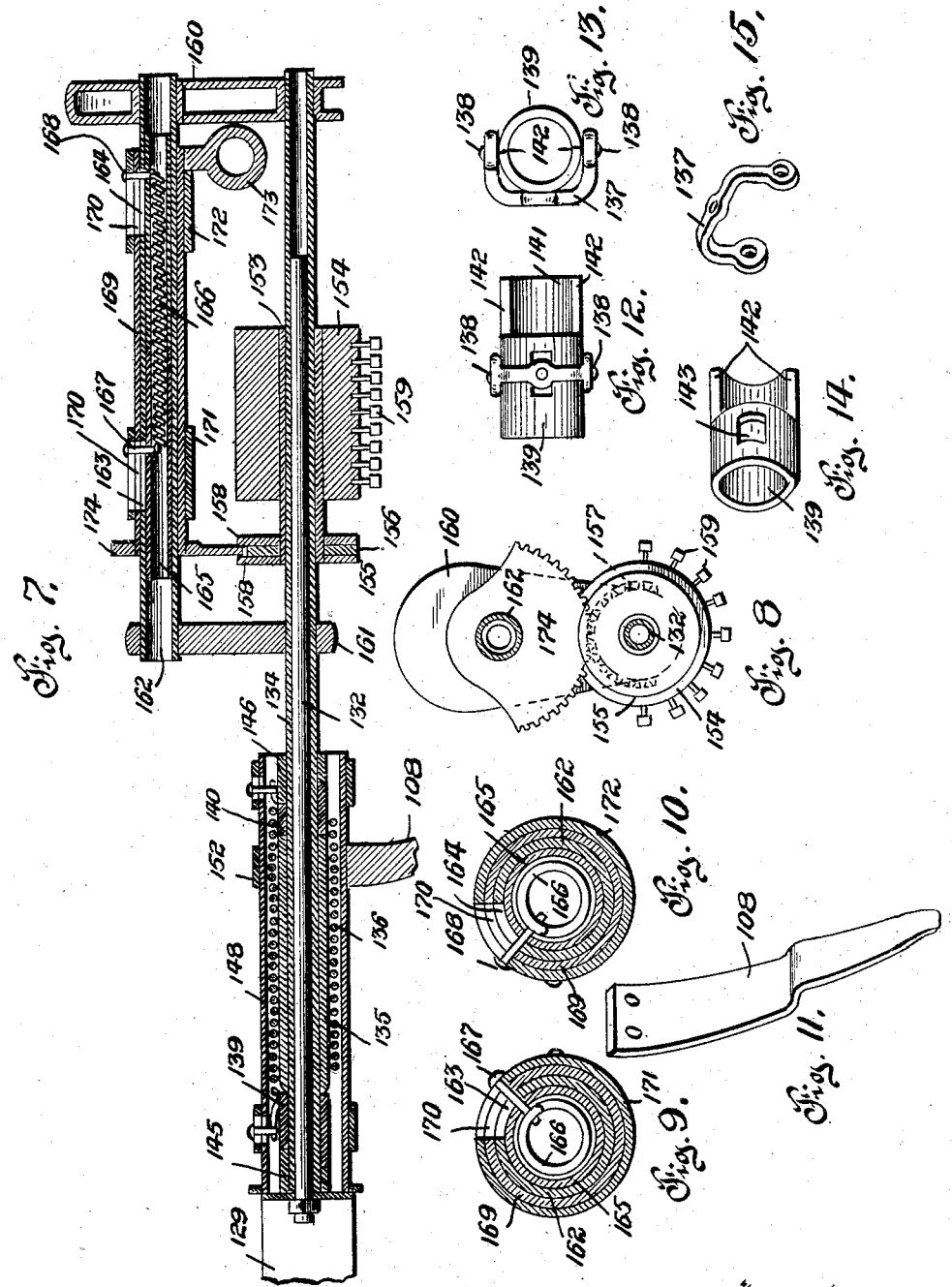

No. 866,514. PATENTED SEPT. 17, 1907.
J. T. PORTER.
TYPE WRITER.
APPLICATION FILED FEB. 26, 1906.
8 SHEETS—SHEET 6.
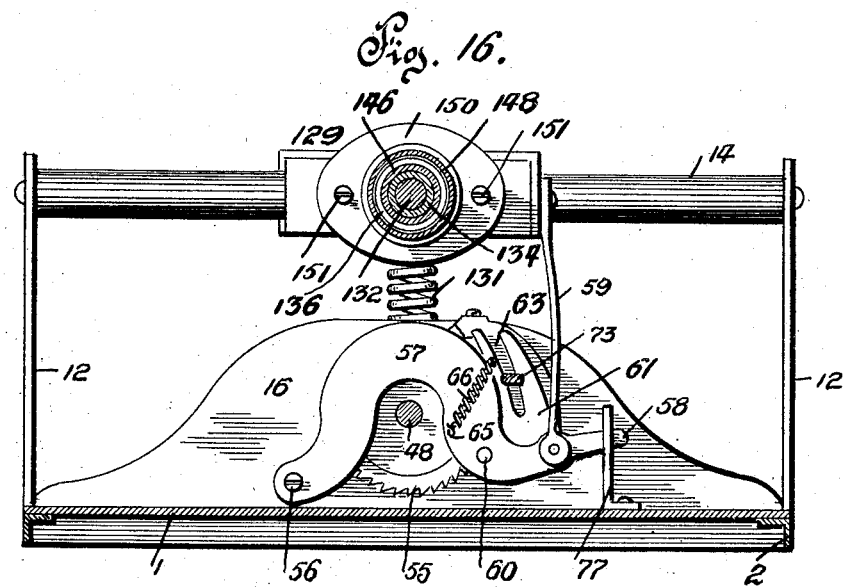
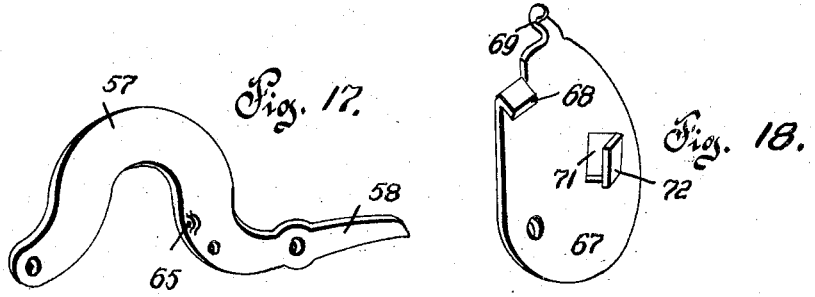
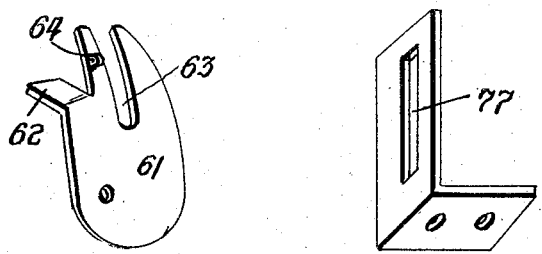
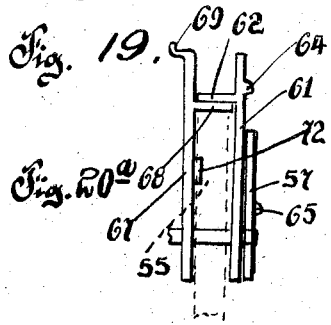

No. 866,514. PATENTED SEPT. 17, 1907.
J. T. PORTER.
TYPE WRITER.
APPLICATION FILED FEB. 26, 1906.
8 SHEETS—SHEET 7.
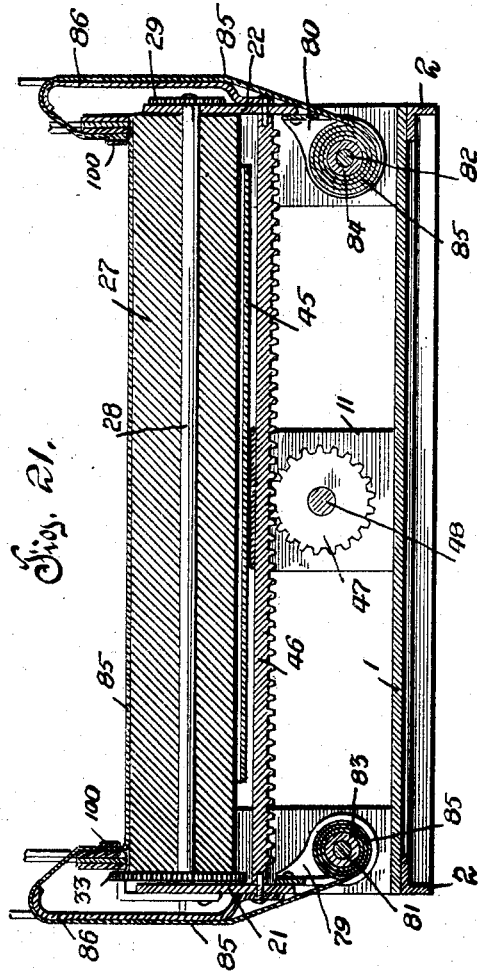
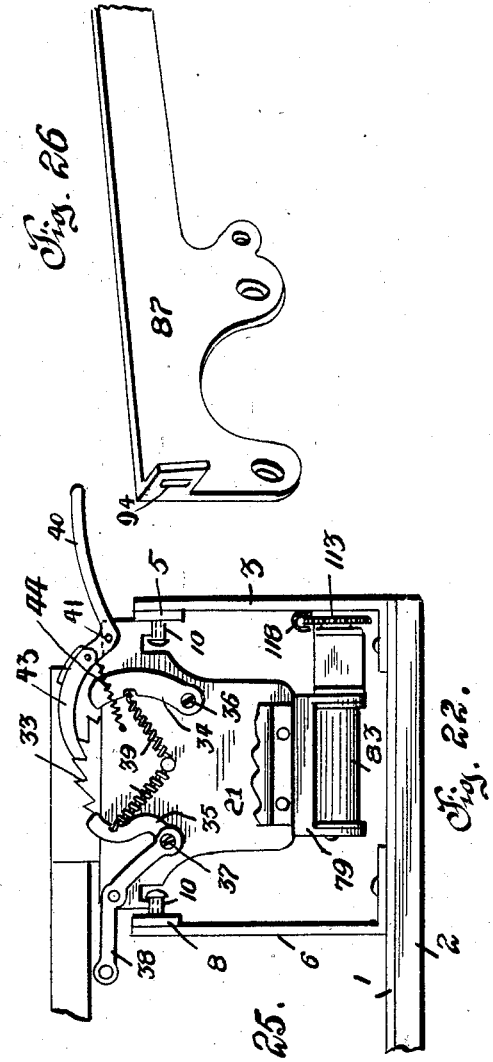
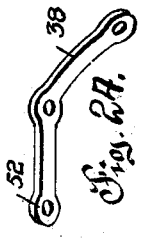
Witnesses:
Inventor.
J. T. Porter,
by H. C. Everts
Attorneys.

No. 866,514.
PATENTED SEPT. 17, 1907.
J. T. PORTER.
TYPE WRITER.
APPLICATION FILED FEB. 26, 1906.
8 SHEETS—SHEET 8.
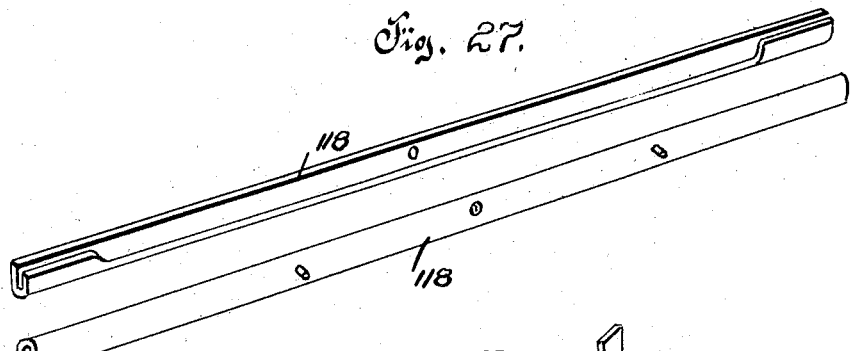
Fig. 27.
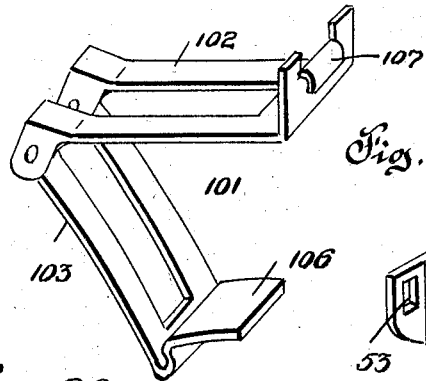
Fig. 28.
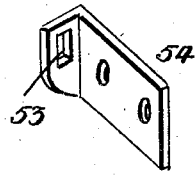
Fig. 30.
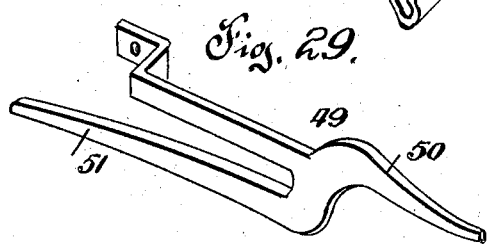
Fig. 29.
Fig. 31.
Fig. 32.
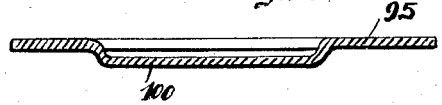
Witnesses:
Inventor.
J. T. Porter,
by H. Everts
Attorneys.

UNITED STATES PATENT OFFICE.

JOHN T. PORTER, OF PITTSBURG, PENNSYLVANIA.

TYPE-WRITER.

No. 866,514.　　　　　Specification of Letters Patent.　　　　Patented Sept. 17, 1907.

Application filed February 26, 1906. Serial No. 302,969.

*To all whom it may concern:*

Be it known that I, JOHN T. PORTER, a citizen of the United States of America, residing at Pittsburg, in the county of Allegheny and State of Pennsylvania, have invented certain new and useful Improvements in Type-Writers, of which the following is a specification, reference being had therein to the accompanying drawing.

This invention relates to certain new and useful improvements in typewriters, and the invention has for its primary object to dispense with the key-board of a typewriter and provide a machine that can be operated with one hand.

My invention aims to provide a novel form of typewriter which can be easily and quickly operated by one hand, without necessitating the use of a person's sight to accomplish the same. In this connection, my invention aims to provide a machine which can be more quickly operated than the present type of machine and with greater accuracy. To this end, the machine is constructed whereby a letter or manuscript can be written with one hand and without the operator's attention, otherwise than the manipulation of the machine by memory. In this manner, the machine permits of a stenographer or operator following his or her notes with one hand, when a letter or manuscript is to be transcribed, while the machine is operated by the other hand. To accomplish this result, it is necessary that the arrangement of the type used in connection with the machine be memorized, whereby the type can be shifted to print any desired character, numeral or punctuation mark. Instead of operating the machine by the fingers, as heretofore, I have devised a machine which will be entirely operated by a wrist movement thereby permitting of a greater amount of work being accomplished upon a machine at one sitting and with greater accuracy.

Another feature of my improved machine resides in the fact that I have dispensed with the key-board, type carrying rods and actuating levers and the other numerous appurtenances generally used to actuate the type of an ordinary machine, such as the "Remington" or "Smith Premier".

The invention in its broadest aspect involves numerous elements which are combined to produce a simple, compact and effective machine, capable of being easily cleaned and free from all danger of being injured by constant use. The elements as combined to produce an effective machine are a base plate and frame, a carriage and platen, a carriage escapement and operating device, a ribbon shifting device and ribbon feeding mechanism, an automatically actuated carriage shifter, a type arm and cylinder and a cylinder actuating mechanism.

With the above and other objects in view, which will more readily appear as the nature of the invention is better understood, the same consists in the novel construction and arrangement of the above mentioned elements which will be hereinafter more fully described and claimed.

Referring to the drawing accompanying this application, like numerals of reference designate corresponding parts throughout the several views, in which:—

Figure 2:
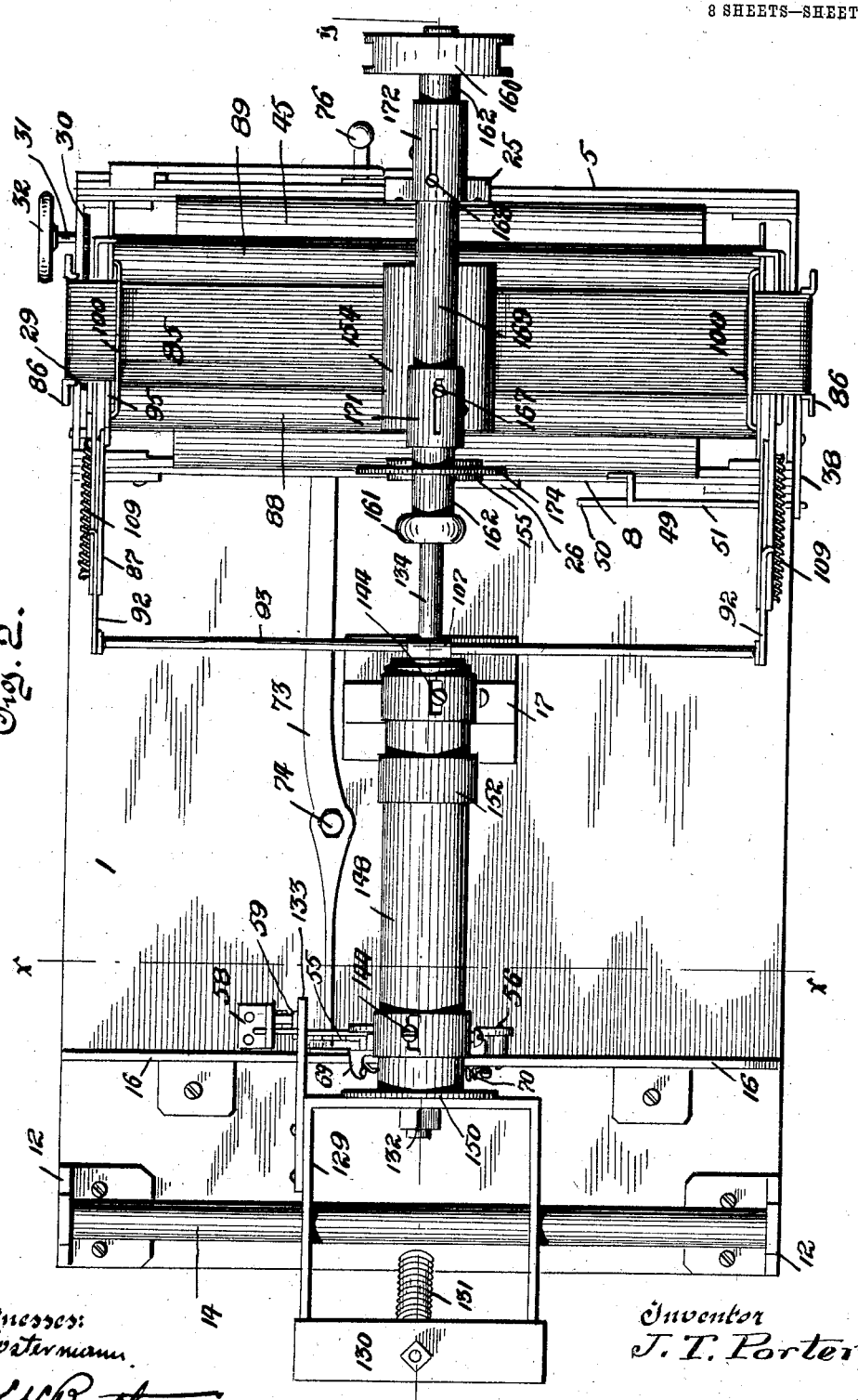
Figure 3:
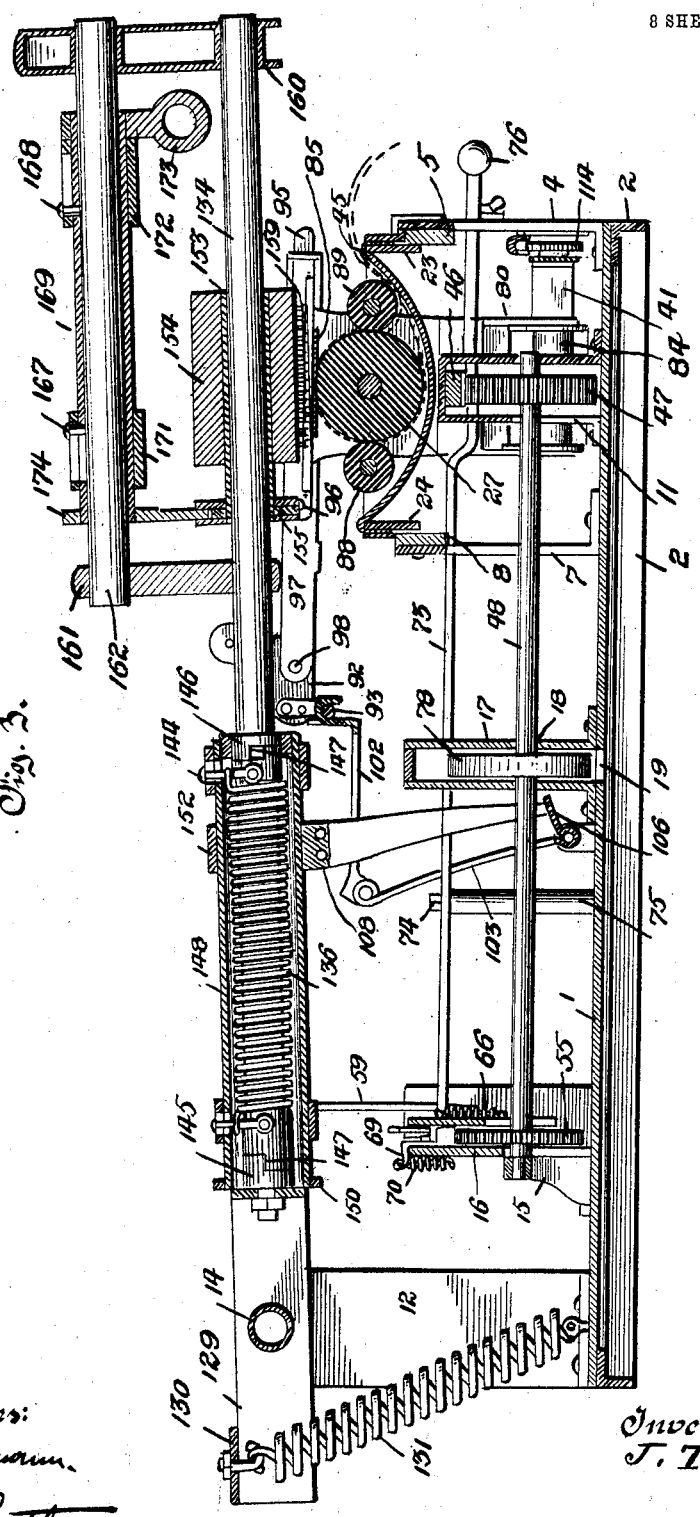

Figure 1 is a side elevation of my improved typewriter machine, Fig. 2 is a plan of the same, Fig. 3 is a longitudinal sectional view taken on the line y—y of Fig. 2, Fig. 4 is a front view of the machine, Fig. 5 is a front elevation of the type arm and cylinder, Fig. 6 is a cross sectional view of the same, taken on the line s—s of Fig. 1 looking in the direction of the arrow, Fig. 7 is a longitudinal sectional view of the type arm and cylinder, Fig. 8 is a cross sectional view of the type arm and cylinder taken on the line z—z of Fig. 1 looking in the direction of the arrow, Fig. 9 is a cross sectional view of a portion of the type arm taken on the line w—w of Fig. 1, Fig. 10 is a similar view taken on the line v—v of Fig. 1, Fig. 11 is a perspective view of a depending lever used in connection with the ribbon shifting device, Figs. 12 to 15 inclusive are detail views of a portion of the type arm, Fig. 16 is a cross sectional view taken on the line x—x of Fig. 2, Figs. 17 to 20 inclusive are detail perspective views of parts of the carriage escapement and operating device, Fig. 20ª is a detail view of a portion of the carriage escapement or operating device, Fig. 21 is a cross sectional view of the carriage and platen taken on the line a—a of Fig. 3, Fig. 22 is an end view of a portion of the carriage and platen, Figs. 23, 24 and 25 are detail views of the platen actuating mechanism, Fig. 26 is a detail perspective view of one end of one of the ribbon shifter arms, Fig. 27 is a detail perspective view of the ribbon winding pawl, Fig. 28 is a detail perspective view of a portion of the ribbon shifting device, Fig. 29 is a similar view of a carriage stop, Fig. 30 is a detail perspective view of a guide plate used in connection with the stop, Fig. 31 is a developed view of the type as preferably arranged upon the type cylinder, Fig. 32 is a longitudinal sectional view of a ribbon shifting plate.

In the accompanying drawings, I have illustrated the various elements, together with their appurtenant parts which are arranged to provide a quick acting and easily manipulated machine. From the following description it will be noted that I have illustrated and used various little mechanisms and certain elements which are common to the ordinary type of machine, such as the "Remington" or "Smith Premier". These elements, namely a platen, guide rollers, and a manually operated platen mechanism are of a conventional form, and I do not care to confine myself to the specific construction of these elements, as they may be slightly modified to conform to the structural features of my improved machine and to produce certain advantages in connection with my improved machine, over and above the present type of machine used.

The preferred embodiments of the machine have been illustrated, but it is obvious that these embodiments are susceptible to various changes without departing from the scope of the invention.

In describing the various elements and their detail construction, each element will in its turn be considered and then a general operation set forth, whereby the machine may be fully understood by those skilled in the art of handling or manufacturing type writers.

*The base-plate and frame.*—The base and main frame of the typewriter consists of a substantially rectangular plate 1 supported by angle bars 2 arranged around the edges of the plate and secured thereto. The front edge of the plate at its corners is provided with upwardly extending standards 3, 3 and 4, to the upper ends of which is secured a transverse carriage supporting bar 5. The base plate 1 in the rear of the standards 3 and 4 is provided with standards 6 and 7, carrying a transverse carriage supporting bar 8, similar to the bar 5. The confronting faces of these bars are provided with a plurality of horizontally alining pins 9 upon which are journaled rollers 10. Centrally of the plate 1 between the standards 3 and 4 and 6 and 7 is mounted a yoke or bearing 11, the object of which will be presently described.

At the rear corners of the plate 1 are erected standards 12, 12 in the upper ends of which is journaled a type arm shaft 14. In front of the standards 12, 12 and centrally of the plate is mounted a bearing 15 and an escapement supporting plate 16, while intermediate said plate 16 and the yoke 11 is mounted a casing 17 having alining openings 18, 18 formed therein. Access is had to the casing 17 through the medium of an opening 19 formed in the base plate 1 beneath the casing.

*The carriage and platen.*—A substantially rectangular carriage frame 20, embodying end plates 21 and 22, and side plates 23 and 24, is slidably mounted upon the rollers 10. The side plates 23 and 24 are provided with angle supporting plates 25 and 26 respectively adapted to rest upon the upper edges of the plates 23 and 24 and assist in guiding and supporting the carriage frame when moving upon the bars 5 and 8. Journaled longitudinally of the carriage frame is a platen 27. One end of the shaft 28 which carries the platen protrudes through the end plate 22 of the carriage frame and is provided with a pinion 29, which meshes with a pinion 30 carried by the inner end of a shaft 31 journaled at one side of the end plate 22 of the carriage frame. The shaft 31 extends through the end plate and is provided with a knob or hand wheel 32, whereby it may be manually rotated to impart a rotary movement to the platen 27. The opposite end of the shaft 28 within the end plate 21 of the carriage frame is provided with a ratchet wheel 33, and adapted to engage said ratchet wheel are escapement dogs 34 and 35. The dog 34 is pivotally mounted, as at 36, to the end plate 21, while the dog 35 is pivotally connected, as at 37, to a bell crank lever 38, pivotally mounted at the rear edge of the end plate 21. The dogs 34 and 35 are connected by springs 39, 39 to the end of the platen shaft 28 or may be connected to a pin carried by the end plate 21. (See Fig. 22.) The dogs 34 and 35 are employed for automatically rotating the platen 27, for instance, when a line has been written and it is desired to make a space, to write another line. The automatic operation of the dogs 34 and 35 will be presently described, but reference will now be had to a lever 40 pivotally mounted as at 41, upon the front edge of the end plate 21. The lever 40 is employed for manually rotating the platen at any desired time and is provided with a spring held dog 43 which engages the ratchet wheel 33 and is normally held in engagement therewith. By depressing the lever 40, the dog 43 is moved forward upon the ratchet wheel 33, and when the lever is released, a spring 44 connected to the end plate 21 and the lever 40 is adapted to return the lever 40 to its normal position, and through the medium of the dog 43, partially rotate the platen. The manually operated lever 40 and its appurtenant parts is of a conventional form commonly used upon typewriter machines.

The side plates 23 and 24 of the carriage frame 20 support a curved guide plate 45 employed for guiding a sheet of paper around the platen 27.

The depending ends of the end plates 21 and 22 support a longitudinally disposed rack 46, which passes through the yoke 11 and meshes with a pinion 47 mounted upon an escapement shaft 48 journaled therein, said shaft also being journaled in the bearing 15 and the casing 17 carried by the base plate 1. When a rotary movement is imparted to the pinion 47 to move the carriage frame 20, the dogs 34 and 35 are actuated through the medium of a carriage stop 49 pivoted upon the side plate 24 of the carriage frame. The carriage stop consists of two oppositely disposed cam arms 50 and 51, the cam arm 50 being adapted to engage in the end 52 of the bell crank 38, while the arm 51 is adapted to pass through an opening formed in an angular guide plate 54, secured centrally of the transverse bar 8. As the carriage frame 20 is returned to its normal position, at the right of the machine, the cam arm 51 passing through the opening 53 of the guide plate elevates the carriage stop and actuates the bell crank lever 38 to partially rotate the ratchet wheel 33 of the platen 27.

*The carriage escapement and operating device.*—The carriage escapement and operating device (see Figs. 16 to 20 inclusive) is carried by the escapement supporting plate 16 of the base plate 1. It will be remembered that the shaft 48 journaled in the yoke 11, casing 17 and bearing 15 is the main escapement shaft, and the position of the bearing 15 relative to the supporting plate 16 necessitates the shaft 48 extending through said plate. Upon the shaft 48 adjacent to the supporting plate 16 is mounted a ratchet wheel 55. Pivotally mounted upon the plate 16 adjacent to the ratchet wheel, as at 56, is a curved lever 57 which extends upwardly over the shaft 48 and then downwardly and has its end extended outwardly, as at 58 in order that an actuating rod 59 may be pivotally connected thereto. Pivotally connected to the lever 57, as at 60, is a pawl 61. The pawl is provided with a laterally extending tooth 62 adapted to engage the teeth of the ratchet wheel 55. The upper edge of the pawl is provided with a slot 63 and a pierced lug 64. Connected to the pierced lug 64 and a similar lug 65 carried by the lever 57 is a spring 66 adapted to normally retain the pawl 61 in engagement with the teeth of the ratchet wheel 55. Upon the plate 16 in the rear of the ratchet wheel 55 is pivotally mounted another pawl 67 carrying a tooth 68 and a rearwardly extending hook 69. The rearwardly extending hook 69 is adapted to extend over the upper edge of the plate 16 and is connected to a coiled spring 70 mounted upon the rear side of the plate 16. The coiled spring is employed to hold the tooth 68 in engagement with the ratchet wheel 55. The pawl 67 is provided with an opening 71, said opening being formed by cutting or shearing the pawl and bending the material outwardly to form a lug 72, along side of the opening 71. The pawl 61 is mounted in front of the pawl 67, and extending through the slot 63 of the pawl 61 and into the opening 71 of the pawl 67, is a longitudinally disposed lever 73, said lever being pivotally mounted, as at 74 upon a post 75 carried by the base plate 1. The lever 73 extends forwardly to the front edge of the base plate 1 beneath the carriage frame 20, and is provided with an operating handle 76. A slotted plate 77 is mounted to one side of the escapement device just described to receive the outer end of the lever 57 and limit its upward movement.

In the casing 17 is mounted a retracting spring 78, one end of which is connected to the casing 17 while the other end is connected to the shaft 48. When the actuating rod 57 is depressed, and the ratchet wheel 55 rotated through the medium of the pawls 61 and 67, the spring 78 is wound up, whereby when the pawls 61 and 67 are released by the end of the lever 73, the spring 78 will return the shaft 48 together with the ratchet wheel 55 to their normal position.

When the actuating rod is being depressed, as will be presently described, the carriage frame 20 is traveling from the left side of the machine to the right and the spring 78 is being wound up. When the carriage has reached its limit and is automatically released, the spring 78 is adapted to return the carriage to its normal position to the left of the machine.

*Ribbon shifting device.*—The end plates 21 and 22 of the carriage frame 20 are provided with depending brackets 79 and 80, (see Figs. 3 and 21). In the brackets 79 and 80 are journaled shafts 81 and 82 respectively, and upon these shafts are mounted spools 83 and 84. One of the spools serves as a ribbon supply spool, while the other spool receives the ribbon. The strip of ribbon 85, which in the present instance is wound upon both spools, passes over guide plates 86, 86 secured to the end plates 21 and 22 of the carriage frame 20.

Pivotally mounted near the rear edge of the end plates 21, 21 are ribbon shifter arms 87, and between said arms are journaled rubber covered rollers 88 and 89, these rollers assisting in the guidance of a piece of paper around the platen 27. The arms extend rearwardly over the carriage frame and are formed with upwardly extending portions 90 carrying outwardly extending pins 91. Pivoted to the upwardly extending portions 90 of the arms 87 are hangers 92, 92. The lower ends of the hangers 92, 92 are connected together by a transverse rod 93. The forward ends of the ribbon shifting arms 87, 87 are provided with slotted lugs 94, 94, and sliding in said lugs are ribbon shifting plates 95, 95. The rear ends of these plates are pivotally connected, as at 96 to plates 97, 97, which in turn are pivotally connected, as at 98, 98 to the hangers 92, 92.

The ribbon shifting plates 95, (see Figs. 3 and 32) are cut and sheared, as at 99, 99 and the material bent outwardly to form guides 100 through which the ribbon 85 passes. By the arrangement of the ribbon shown in Fig. 21 of the drawings, it will be observed that the ribbon passes directly over the top of the platen, 27, and that the width of the guide plates 86, 86 permit of the ribbon 85 being shifted through the medium of the plates 95, 95, hangers 92, 92 and the transverse rod 93. By pivotally mounting the ribbon shifting arms 87, 87, which carries the shifting plates 95, I am enabled to slightly elevate the forwardmost rubber roller 89, when placing a piece of paper around the platen, as shown in Fig. 3 of the drawings. A sheet of paper is adapted to pass beneath the rubber roller 89, upwardly over and around the platen 27 and out under the rubber roller 89. The curved plate 45 supports the sheet of paper in passing over the edge of the bar 23 of the carriage frame, and beneath the roller 89, it being observed that the paper after being printed upon passes outwardly upon the same side of the carriage as it enters.

To actuate the roller shifting arms 87, 87 through the medium of the transverse rod 23, I employ a strap 101 consisting of two hinged yokes 102 and 103. The yoke 103 is pivotally mounted as at 104 in brackets 105 carried by the base plate 1 adjacent to the casing 17. The pivoted end of the yoke 103 is provided with an outwardly extending lip 106, while the yoke 102 is provided with a hook-shaped member 107 adapted to engage over the transverse rod 93. The yoke 103 embraces the shaft 48, and extending downwardly through the yoke 102 is an actuating arm 108 adapted to engage the lip 106. When the actuating arm 108 is depressed, as will hereinafter be more fully described, the transverse rod 93 is moved forward through the medium of the strap 101 and the ribbon 85 is shifted at each change of the characters, that is, when small letters are being used and a shift is made to the capital letters, numerals or punctuation marks, as will hereinafter appear. In order to return the ribbon shifting plates 95 to their normal position, springs 109, 109 are connected to the pins 91 of the arms 87 and to outwardly extending lugs 110 carried by the lower edges of the ribbon shifting plates 95, 95.

*Ribbon feeding mechanism.*—The ribbon shifting device just described is employed for horizontally shifting the portion of ribbon 85 above the platen 27. In order that the ribbon may be fed from one spool to another, I have devised a mechanism which is automatically actuated by the movement of the carriage frame 20. The forward sides of the depending brackets 79 and 80 are provided with auxiliary brackets 111, 111, and supported by said brackets is a transversely disposed guide bar 112. The ends of the shafts 81 and 82 extend through the auxiliary brackets, and the ends of the guide bar 112, and are provided with ratchet wheels 113 and 114, the teeth of the ratchet wheel 113 being the reverse of the ratchet wheel 114. Fulcrumed approximately central of the guide bar 112, as at 115, is a lever 116. Pivotally connected to the upper end of the lever 116, as at 117, is a channel-shaped double acting pawl 118. The channel shaped ends of the pawl are adapted to overlie the ratchet wheels 113 and 114. Connected to a pin 119 carried by the lever 116 are springs 120 and 121, these springs being connected to the pawl 118 adjacent to its ends, whereby first one end of the pawl will be held in engagement with one of the ratchet wheels and then the other end of the pawl, with the other of said ratchet wheels, as will be presently described.

The standard 4 of the base plate 1 is provided with an adjustable arm 122 adapted to strike a pin 123 carried by the pawl 118 and move said pawl to actuate one of the ratchet wheels 113 or 114. In Fig. 4, the pawl is illustrated in position to partially rotate the ratchet wheel 113. When the carriage travels to the right of the machine, the pin 123 strikes the arm 122 causing the pawl 118 to be moved forward, which partially rotates the ratchet wheel 113. The spring 120 is adapted to return the pawl to its normal position. The spring 120 in returning the pawl 118 to its normal position actuates the ratchet wheel 114. Another spring 119$^a$ is mounted upon the pin 119, the ends 119$^b$ and 119$^c$ bearing upon the top of the pawl 118. This spring is used in conjunction with the springs 120 and 121, for maintaining the ends of the pawl 118 in engagement with the ratchet wheels 113 and 114.

To reverse the movement of the ribbon 85 upon the spools, the arm 122 is adjusted to strike the pin 119, the arm being swung downwardly to engage the pin 119 each time the carriage is shifted. It will be seen that when the pin 119 strikes the arm 122, the end 119$^b$ of the spring 119$^a$ will force the end of the pawl 118 against which it bears, into engagement with the ratchet wheel 114, while the end of the spring 119$^c$ will recede. When the arm 122 is adjusted to strike the pin 123, the end 119$^c$ of the spring 119$^a$ will force the pawl 118 downwardly to actuate the wheel 113, while the end 119$^b$ of the spring will recede.

*The automatically actuated carriage shifter.*—Upon the front carriage supporting bar 5 is pivoted a locking lever 124 having notches 125 and 126 formed in its end. Also secured upon the carriage supporting bar 5 is a guide plate or bracket 127 having a slot 128 formed therein. Extending into the slot 128 is the forward end of a longitudinally disposed lever 73, which has its opposite end extending into the opening 71, and the slot 63 of the pawls 67 and 61 respectively. When a letter or manuscript is being written, and the carriage is being moved from the right of the machine to the left thereof, the lever is maintained in a fixed position by the locking lever 124, the notch 125 of which engages the forward end of the lever 73. This position of the lever 73 permits of the pawl 61 being actuated independently of the lever 73, and the opening 71 of the pawl 67 is of a sufficient size to permit of a slight movement of said pawl irrespective of the lever 73. The carriage frame together with its attachment including the platen roller, the rack and the ribbon and its carrying mechanism, are movable upon the rollers 10 transversely of the frame, and is adapted to extend at the ends beyond the frame so as to bring all parts of the paper into proper position beneath the type carrying roller. When the carriage frame 20 has reached the limit of its movement to the left, the depending bracket 80 of the carriage frame 20 impinges upon the lever 73 and permits the locking lever 124 to descend until the notch 126 engages the lever 73. The movement of the lever 73 by the carriage frame 20 moves the pawls 61 and 67 out of engagement with the ratchet wheel 55, permitting the retracting-spring 78 carried within the casing 17 to rotate the shaft 48 and return the carriage frame 20 and its appurtenant parts to its normal position at the right of the machine. Upon the carriage frame receding, the springs 66 and 70 return the pawls 61 and 67 to their normal position, to again be actuated by the rod 59.

*Type arm and cylinder.*—Mounted centrally upon the type arm shaft 14 is a yoke or stirrup 129 having its rear ends connected together by a plate 130. The plate 130 is connected to the base plate 1 by a heavy coiled spring 131. The forward end of the yoke or stirrup 129 is provided with an outwardly extending arm 132. One side of the stirrup or yoke 129 is provided with a short arm 133 to which is connected the actuating rod 59 employed for actuating the carriage escapement and operating device heretofore described. Detachably mounted upon the arm 132 is a sleeve 134. Mounted upon the sleeve 134 adjacent to the stirrup or yoke 129 is a fixed sleeve 135, said sleeve being surrounded by a coiled spring 136. The ends of the coiled spring 136 are attached centrally of stirrups 137, said stirrups being pivotally connected, as at 138, 138 to collars 139 and 140. The collars have their outer ends cut away, as at 142, forming shoulders. The collars 139 and 140 are provided with openings 143 beneath the stirrups 137, whereby screws 144 may pass through the stirrups 137 and extend into the openings 143 to limit the movement of the stirrups upon the collars 139 and 140. Secured upon the sleeve 134 adjoining the collars 139 are stationary collars 145 and 146. The stationary collars are cut away and provided with shoulders 147, 147 similar to the shoulders 142 of the collars 139 and 140, but the collars 145 and 146 are arranged the reverse of the collars 139 and 140 whereby the shoulders of the adjoining collars will confront one another. In cutting away the collars to form their respective shoulders, I cut away sufficient material to permit of a partial rotation of the collars 139 and 140 in either direction, the rotation of said collars only being limited by the shoulders 147 of the stationary collars 145 and 146. The result of this construction is that the sleeve 134 can be turned to the right or to the left and the spring 136 will return the sleeve 134 to its original position.

Inclosing the spring 136 and the collars 139, 140, 145 and 146 is a cylindrical casing 148, one end of which is flanged as at 150, and secured to the stirrup or yoke 129, as at 151, 151. The cylindrical casing 148 carries a strap 152 to which is secured a depending actuating arm 108.

Near the outer end of the sleeve 134 is mounted a collar 153 carrying a type cylinder 154 upon its forward end, and a three-piece wheel represented as a whole at 155 upon its opposite end. The central portion 156 of the wheel 155 has a portion of its periphery provided with teeth 157, while the outer sides or pieces 158, 158 of the wheel 155 form guide flanges at the ends of the teeth 157.

Upon the periphery of the type cylinder 154 are arranged the type 159 of my improved machine. The type are arranged in nine circumferentially arranged rows with nine type to each row, thus making eighty-one type in all. The forwardmost three rows of type are capitals, which I term the "first case"; the intermediate three rows are small letters which I term the "second case", while the rearmost three rows are numerals and punctuation marks hereinafter referred to as the "third case." The arrangement of the three cases or fonts of type is shown in Fig. 31 of the drawings, and will be hereinafter again referred to in the general operation of my improved machine.

*The cylinder actuating mechanism.*—Upon the extreme end of the sleeve 134 is mounted a bracket or casing 160 which serves functionally as a handle by which my improved machine is manipulated. Intermediate the three-piece wheel 155 and the end of the casing 148 is mounted a bracket 161. Mounted between the brackets 160 and 161 is a longitudinally disposed tube 162, said tube being slotted as at 163 and 164. In the tube 162 is mounted a sleeve 165 containing a coiled spring 166. The ends of the coiled spring 166 are secured to the ends of screws 167 and 168 that extend through the sleeve 165 and upwardly through the slots 163 and 164 of the tube 162. Upon the tube 162 is loosely mounted a casing 169, which is slotted, as at 170, 170, to permit of the screws 167 and 168 extending therethrough. Secured upon the casing 169 adjacent to the slots 170 thereof are slotted collars 171 and 172, the screws 167 and 168 also extending into slots in said collars. The collar 172 is provided with a depending eyelet shaped handle 173, the object of which will presently appear. The rear end of the casing 169 is provided with a segment shaped rack 174 adapted to mesh with the toothed portion 156 of the three-piece wheel 155 carried by the collar 153 of the arm 132. The construction employed in connection with the cylinder actuating mechanism is somewhat similar to the mechanism housed by the casing 148. The arrangement of the spring 166 within the tube 162 permits of the casing being moved to the right or left by the handle 173, and also permits of the casing 169 being moved longitudinally upon the tube 162, which through the medium of the segment shaped rack 174 and the wheel 155, moves the type cylinder upon the sleeve 134. By the arrangement of the mechanism just described, I am enabled to shift the type cylinder 154 whereby any individual type of the "cases" can be positioned in vertical alinement with the sleeve 134 and the type cylinder actuating mechanism.

By referring to Figs. 1 and 2, it will be observed that the type cylinder 154 is directly over the central portion of the platen 27, and the ribbon 85, and when in this position, the normal position of the type cylinder and arm is such that the "i" type is in position to be printed by depressing the arm 132, until the type cylinder is moved into engagement with the ribbon 85 of the carriage frame 20. Should it be desired to print any of the characters forward or in the rear of the "i" type, the handle 173 is moved until the row of type containing the desired character is reached, this movement being permitted by the sleeve 134 sliding upon the arm 132, the movement of which is limited by the casing 148, and should the character be to the right or left of the "i" type, the handle 160 carried by the sleeve 134 is turned either to the right or left, as the case may be, to bring the required character in the required position relative to the platen. Thus the manipulation of the handle 173 longitudinally of the mechanism adjusts the cylinder 154 to bring the transverse row of characters which contains the required character in proper position, and the manipulation of the handle 160 adjusts the cylinder to bring the longitudinal row of characters which contains the required character into proper position relative to the platen. The spring 136 is adapted to return the cylinder actuating mechanism to its normal position in vertical alinement with the arm 132 and the carriage frame 20, while the spring 166 is adapted to shift the type cylinder 154 to its normal position upon the sleeve 134, that is, so that the "i" type will again be in position to be printed, this type representing the normal position of the type cylinder.

*General operation.*—In inserting a piece of paper to be operated upon in the machine, the ribbon shifting arms 87, 87 carrying the rubber rollers 88 and 89 are slightly elevated to permit of the end of the paper being inserted between the roller 89 and the platen 27, and by either operating the lever 40 or the knob or wheel 32, the sheet of paper is passed around the platen 27 beneath the ribbon 85, and is thus disposed in position to be operated upon. The carriage frame 20 is then shifted to place the desired portion of the sheet of paper beneath the type arm 132. This arm is normally held in a partially elevated position by the spring 131 secured to the stirrup or yoke 129 and the base plate 1.

In order that the operation of my improved machine may be readily understood, I will assume that an operator who has memorized the arrangement of the type 159 and is perfectly familiar with the manipulation of the machine, is to write the word "May" upon the paper within the machine. The operator grasps the bracket or handle 160, placing his or her fore finger in the eyelet-shaped handle 173 of the type cylinder actuating mechanism. As the first letter "M" is in the "first case", the operator shifts the type cylinder rearwardly until the first row of type of the "first case" is disposed in printing position relative to the paper. As the letter "M" happens to be central of the first row, it is in position to be printed. By depressing the type arm 132, the "M" type strikes the ribbon and makes an impression upon the paper. As the operator lightly grips the type arm 134, the spring 131 will return the type arm to its partially elevated position, and the spring 166 within the sleeve 165 of the tube 162 will return the type cylinder to its normal position, this being accomplished through the medium of the segment shaped rack 174 and the wheel 155, it being understood that the collar 153 is slidably mounted upon the sleeve 134. Simultaneous with the depression of the type arm 132 the actuating rod 59 moves the lever 57 carrying the pawl 61, and the tooth is adapted to recede over one of the teeth of the ratchet wheel 55 until the type arm 132 is elevated by the spring 131. The upward movement of the arm 132 causes the pawl 61 to rotate the ratchet wheel 55, which through the medium of the shaft 48 moves the carriage frame 20 a prescribed distance, or one space, and places the sheet of paper carried by the platen 27 of the carriage in position to receive an impression of the next letter "a" of the word "May." The ratchet wheel 55 is retained in its moved position by the pawl 67 and for future reference, I desire to call attention to the fact that the rotation of the shaft 48 places the spring 78 under tension. To print the next letter of the word "May", which is a small "a", the operator turns the bracket or handle 160 to the left thereby rotating the type cylinder 154 and placing the letter "a" in the position formerly occupied by the letter "i". The type arm 132 is then depressed as before to leave an impression of the letter "a" upon the sheet of paper following the capital letter "M". To print the small letter "y", it is necessary for the operator to shift the type cylinder 154 forwardly to the forward row of the "second case", which is accomplished by the handle 173. The handle 160 is then turned which places the letter "y" in the position formerly occupied by the letter "i". The type arm is then depressed as heretofore to impress the letter "y" upon the piece of paper mounted in the carriage frame.

The partial rotation of the type arm to the right or left is limited by the shoulders 142, 142 and the shoulders 147, 147 of the collars 139 and 146 respectively, while the longitudinal shifting of the type cylinder 154 is limited by the screws 167 and 168 moving in the slots of the tube 162, casing 169 and collars 171 and 172.

As the spring 131 simply holds the type arm 132 in a partially elevated position, it is only necessary to further elevate the type arm to make two or more spaces, such as would be necessary between words and sentences. After the type arm has been depressed and recedes to its partially elevated position, the ratchet wheel 55 is only rotated one tooth or space, but upon being further elevated, the ratchet wheel 55 can be further rotated, either the distance of one or two teeth, thus making one or two spaces, but it is possible to elevate the type arm sufficiently to make four spaces. After the operator has become accustomed to the movement of the type arm, said arm can be easily and quickly manipulated to make one space or two or more spaces as desired, this manipulation of the arm simply being accomplished by a vertical movement, while the printing of some of the type is accomplished by partially rotating a portion of the type arm.

I will now assume that an entire line has been written upon the paper and that the carriage frame 20 has almost reached its limit of movement to the left of the machine. As the bracket 80 strikes the lever 73, the lever releases the pawls 61 and 67 and permits the spring 78 of the shaft 48 to return the carriage frame 20 to its normal position, this being accomplished through the medium of the pinion 47 and the rack 46. Simultaneously with this movement, the carriage stop actuates the dogs 34 and 35 to partially rotate the platen 27, to provide a space upon the paper of the carriage, upon which another line may be written. The cam arms 50 and 51 engaging the guide plate 54 and the bell crank lever 38 actuates the dogs 34 and 35 to move the ratchet wheel 33 of the platen 27.

Should it be desired to return the carriage frame 20 to its normal position, at any time, before a complete line has been written, the operator moves the lever 73 to release the pawls 61 and 67, thereby permitting the carriage to recede to the right hand side of the machine.

To shift the ribbon 85 laterally over the platen 27, while the machine is being used, the ribbon shifting arms 87, 87 carrying the ribbon shifting plates are employed and these plates are moved through the medium of the transverse rod 93, strap 101, and depending arm 108, the arm 108 striking the lip 106 of the strap 101 each time the type arm 132 is depressed. The shifting of the ribbon laterally over the platen is necessary in order that the entire surface of the ribbon may be used, and to further accomplish this, I have provided the pawl 118 and the adjustable arm 122. The pawl 118 engaging the ratchet wheels 113 and 114 of the shafts 81 and 82 is adapted to rotate said shafts when the pin 123 of the pawl 118 strikes the adjustable arm 122, this being accomplished when the carriage frame 20 is returned to its normal position at the right side of the machine, prior to another line being written by the machine. The springs 120 and 121 return the pawl 118 to its normal position, in order that it may be again actuated. The springs serve to retain the outer ends of the pawl in engagement with said wheels and the rotation of the wheel 113 is adapted to wind the ribbon 85 upon the spool 83 of the shaft 81, while the rotation of the wheel 114 in the same direction as the wheel 113 is prevented by the end of the pawl 118 engaging the teeth of the ratchet wheel 114.

It will be observed from the foregoing taken in connection with the drawings, that I have devised certain novel mechanisms for automatically shifting the carriage frame 20, shifting the ribbon of said carriage and automatically rotating the platen of said carriage, and after a person has familiarized themselves with the manipulation of the type arm 132, it will be possible to rapidly manipulate the entire machine.

It is obvious that the arrangement of the type 159 of the type cylinder 154 can be readily changed and rearranged to suit the convenience of the owner or operator of the machine, and in some instances, some of the characters, numerals or punctuation marks of the cylinder may be dispensed with, when the machine is employed for a special purpose.

I do not care to confine myself to the specific construction of my improved machine, as numerous changes, such as are permissible by the appended claims, may be resorted to without departing from the spirit and scope of the invention.

What I claim and desire to secure by Letters Patent, is:—

1. In a typewriter, the combination with a supporting base, an arm swinging from said base, means for yieldably supporting the free end of said arm in elevated position, spaced standards carried by said arm, a cylinder mounted for oscillation upon said arm between said standards and likewise movable longitudinally of the arm, connecting means between the free ends of said standards, connecting means between said standard-connecting means and type cylinder and operating to oscillate the same when the standards are actuated, manually operating means for moving said cylinder longitudinally of said arm, a carriage movably disposed upon said base, a platen supported upon said carriage, and an inking element between said platen and cylinder.

2. In a typewriter, the combination with a movable carriage frame, of a swinging arm carrying a type cylinder and supported above said frame, spaced standards swinging upon said arm, and spaced from the ends of said type cylinder connecting means between said standards at their free ends, connecting means between said standard connecting means and type cylinder and operating to oscillate the same when the standards are actuated, and means actuated by said cylinder to move said carriage.

3. In a typewriter, the combination with a movable carriage frame carrying a platen and an inking element, of a swinging arm carrying a type cylinder, means for movably supporting said arm and its cylinder above said platen and inking element, spaced standards swinging upon said arm and spaced from the ends of the type cylinder, connecting means between said standards, connecting means between said standard connecting means and type cylinder and operating to oscillate the same when the standards are actuated.

4. In a typewriter, a supporting base, an arm swinging from said base, a cylinder having type characters arranged thereon and mounted for rotation and movable longitudinally on said arm and provided with a gear segment, a frame movable transversely of said base, a platen carried by said frame, a printing ribbon carried by said frame and extending over said platen, spaced standards carried by said arm, a connecting member between said standards, a gear segment carried by said standard connecting means and engaging the gear segment of said cylinder and movable longitudinally of said standard connecting means whereby the operating of said standards will dispose the cylinder in printing position.

5. In a typewriter, a supporting base, an arm swinging from said base at one end, a cylinder having type characters arranged thereon and mounted for oscillation upon and movable longitudinally of said arm, spaced guides disposed transversely upon said base at the opposite end thereof, a frame movable on said guides, a platen mounted for rotation on said frame, spaced swinging drums carried by said movable frame, a ribbon connected to said drums and extending over said platen, means for manually winding said ribbon upon said drums, and means operating by the depression of said arm for moving said drums with the ribbon carried thereby transversely of said frame and platen.

6. In a typewriter, the combination with a stationary base, spaced standards rising from said base at one end, a connecting member rotatively disposed between said standards, a frame connected to said rotative member and swinging therewith, an arm extending from said frame and comprising a central rod and with a tubular member disposed thereon, a type cylinder having spaced type characters arranged in longitudinal and transverse rows, a sleeve within said cylinder and mounted for rotation upon said tubular arm member and extending at one end beyond the cylinder, a gear segment carried by the extended portion of said cylinder, spaced stops at opposite sides of said gear segment, spaced standards carried by said tubular member, a connecting means between said standards, a slidable member upon said standard-connecting member, a gear segment connected to said slidable member and engaging the gear segment of said sleeve and operating between the spaced stops thereof, means for manually operating said slidable member, a platen carried by said base in the path of said cylinder, and an inking ribbon between said platen and cylinder.

7. In a typewriter, the combination with a stationary base, an arm swinging from said base and including a central rod and an inclosing tubular member, means for yieldably supporting said tubular member in one position, a cylinder carrying type characters and provided with a central sleeve rotative upon said tubular member and extending at one end in advance of the cylinder, a gear segment carried by the extended portion of said sleeve and provided with spaced stops, spaced standards carried by said tubular member, a tubular connecting member between said standards, a sleeve slidable longitudinally upon said standard-connecting member, means for maintaining said slidable sleeve yieldable in one position relative to standard-connecting member, a gear segment carried by said slidable sleeve and engaging the gear segment of said type cylinder and operating between the spaced stops thereof, and means for yieldably maintaining said arm in elevated position.

In testimony whereof I affix my signature in the presence of two witnesses.

JOHN T. PORTER.

Witnesses:
R. J. MACRORY,
W. P. MONTGOMERY.